Figure 1:
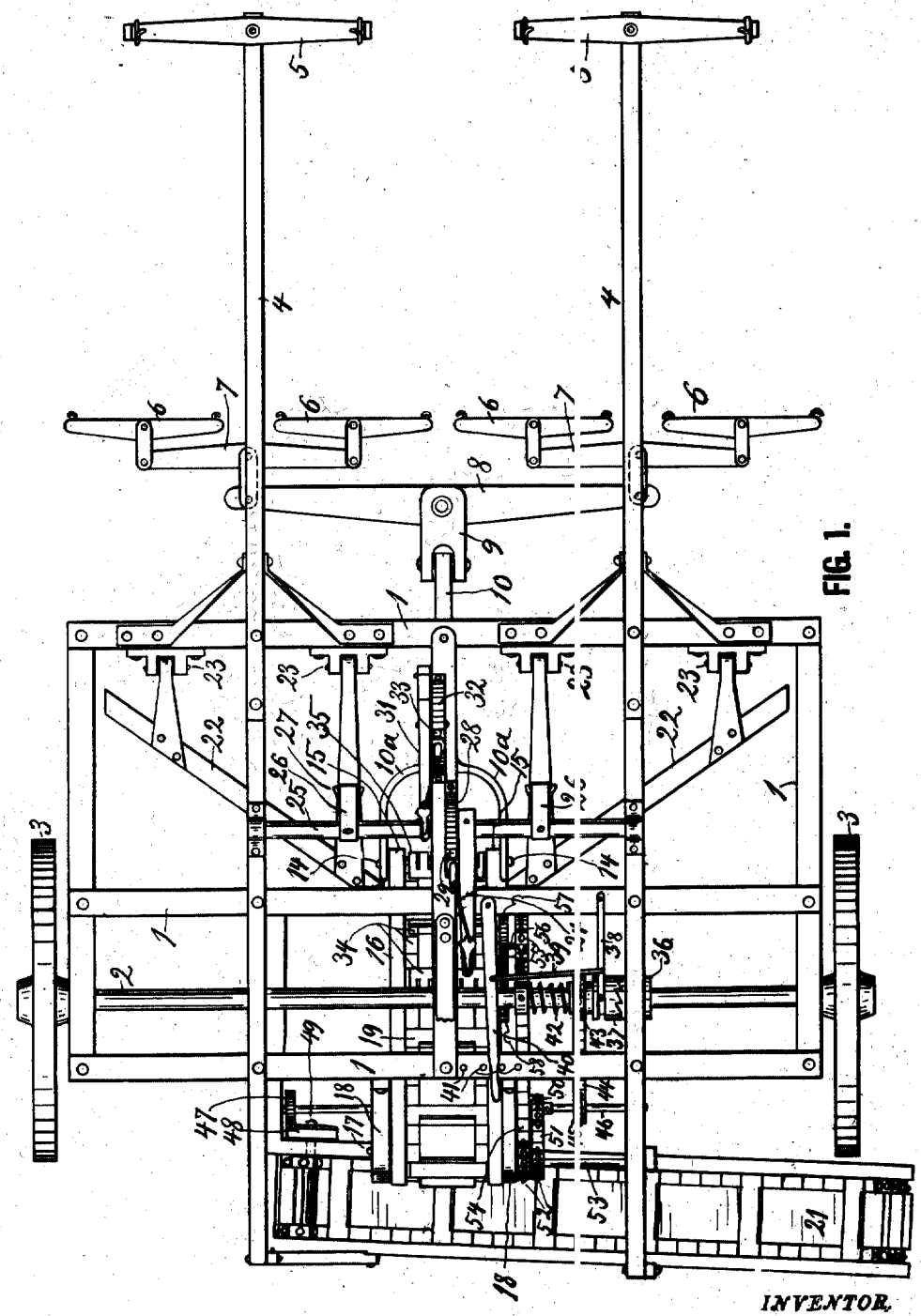

J. J. VOGEL.
STONE PICKER.
APPLICATION FILED JULY 20, 1916.

1,216,751.

Patented Feb. 20, 1917.
2 SHEETS—SHEET 1.

INVENTOR.
J. J. VOGEL.
BY HIS ATTORNEY:
A. M. Carlsen

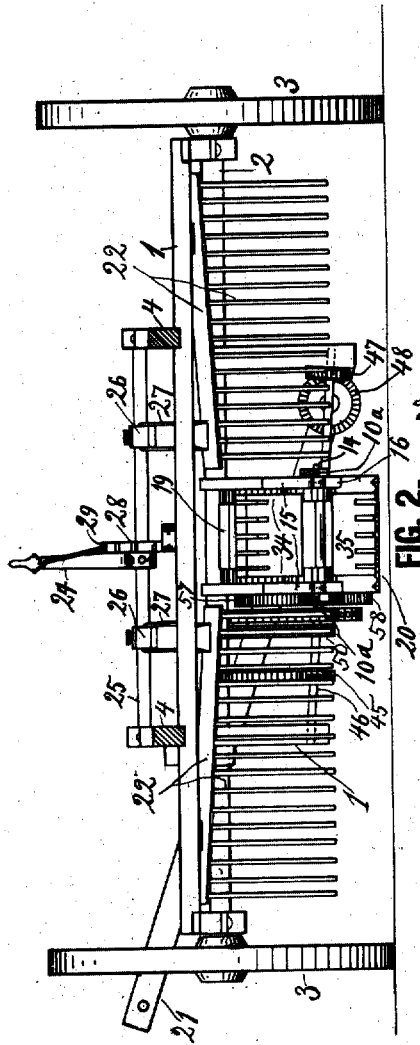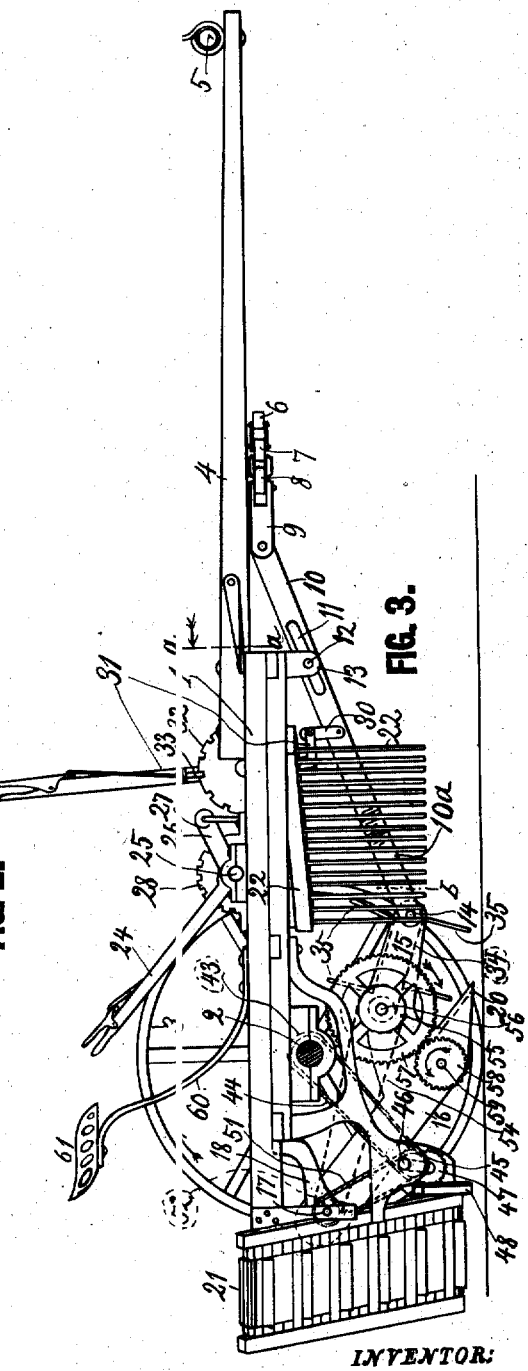

UNITED STATES PATENT OFFICE.

JOSEPH J. VOGEL, OF SPRINGFIELD, MINNESOTA.

STONE-PICKER.

1,216,751.  Specification of Letters Patent.  Patented Feb. 20, 1917.

Application filed July 20, 1916. Serial No. 110,384.

*To all whom it may concern:*

Be it known that I, JOSEPH J. VOGEL, a citizen of the United States, residing at Springfield, in the county of Brown and State of Minnesota, have invented a new and useful Stone-Picker, of which the following is a specification.

My invention relates to devices for gathering and removing stones from plowed fields; and the object is to provide a novel and efficient device of said kind, the same to be a riding machine adapted to be drawn by horses or other animals or motive power of any kind.

In the accompanying drawings, Figure 1 is a top or plan view of my improved stone picking machine arranged for operation by draft animals. Fig. 2 is a sectional front elevation on the line *a—a* Fig. 3 with the fork 10—10ᵃ intersected at the line *b* and the lever 31 and some other parts omitted. Fig. 3 is a side elevation of the machine shown in Fig. 1, with one of the supporting wheels removed.

Referring to the drawings by reference numerals, 1 designates the main frame, which is supported by an axle 2 and two wheels 3 which by dogs (not shown) are so connected that they will rotate the axle when the machine is moving forward. To enable the machine to be drawn by draft animals it is provided with poles 4, 4, neck yokes 5, 5, whiffle-trees 6, swingle-trees 7 and an evener bar 8; to the latter bar is attached by a link 9 the forward end of the draft bar 10, having a slot 11 riding on a bolt 12 in a bracket 13, as best shown in Fig. 3. Said draft bar has its rear end bifurcated into two arms 10ᵃ, which are pivotally secured at 14 to the front corner arms 15 of a frame 16. The latter frame has its rear end pivoted by an elevator shaft 17, in brackets 18 of the main frame 1. In said frame 16 is mounted an inclined endless elevator or conveyer 19, forward of which the frame has a toothed shovel 20 (see Figs. 2 and 3) by which to gather and guide the stones upwardly, rearwardly and to said conveyer. The conveyer 19 delivers the stones into a transversely arranged inclined endless conveyer 21, which delivers the stone into a wagon (not shown) driven alongside the machine. The means which drive the conveyers and gather the stones in front of the shovel, and other features, will now be described.

The stones, say from two inches to eight inches in diameter, are gathered in front of the shovel by rearwardly converging rakes 22, which are pivoted at 23 (see Fig. 1) and may be raised and lowered by a hand lever 24, rock shaft 25, rocker arms 26, and links 27; a notched sector 28 and a dog 29 on the lever serving to hold the rake at the desired elevation either in or above the ground.

In similar manner the shovel is held at the desired elevation above or depth in the ground by a link 30, lever 31, sector 32 and dog 33.

Mounted between the arms 15 is a short endless conveyer composed of endless chains 34 carrying toothed blades 35 which act as rakes to move the gathered stones rearwardly over the shovel or scoop 20.

The main axle 2 carries a fixed clutch member 36 (see Fig. 1) with which meshes a slidable clutch member 37 controlled by a shifter 38, link 39 and hand lever 40, and lever keeping pegs 41, a spring 42 serving to throw the slidable clutch member normally into mesh with its mate.

The clutch member 37 is fixed to a sprocket 43 which by a chain 44 drives a sprocket 45 and a shaft 46 fixed therein and journaled across the main frame. On said shaft is fixed a gear wheel 48 fixed on the lower shaft 49 of the conveyer 21, which is thus operated.

Fixed on the shaft 46 is also a sprocket 50 (see Fig. 1) which by a chain 51 rotates a double sprocket 52 mounted on a short shaft 53 (see Fig. 1) arranged in line with the conveyer shaft 17, of which it may be a stud-like portion. Said double sprocket 52 drives an endless chain 54, and by it a sprocket 55 and the conveyer shaft 56 of conveyer 34—35. Fixed on the shaft 56 is a gear 57 meshing with a gear 58 fixed on the conveyer shaft 59 which is thus rotated in the proper direction as best shown in Fig. 3.

On a post 60 is mounted a seat 61 for the driver to occupy.

In further explanation of the operation of the machine, it will be understood by looking at Fig. 3, that the bar 10, pivot 12, link 30, lever 31, sector 32 and dog 33 decide the depth of the shovel in the ground or its elevation above the ground, and also bear a portion of the pulling strain on the bar 10; the rest of the strain is borne by the pivot and shaft 14 in the front end of the frame 15—16. The rest of the operation has already been described.

What I claim is:—

1. In a stone gathering and removing machine, the combination of a pair of ground wheels and axle in same, a main frame mounted on the axle and having means for engaging and drawing it on said wheels, a forwardly inclined endless main conveyer having a frame pivoted at its rear end to swing up and down with the front end, a shovel carried by said front end, a short endless conveyer mounted in said frame above the shovel and arranged to move the stones rearwardly over the shovel, a pair of rearwardly converging rake bars carried by the main frame and having teeth by which to remove the stones from plowed land and gather them in front of the shovel, a clutch controlled operative connection between said elevators and the axle; means for raising, lowering and holding said shovel at the desired elevations, means for raising, lowering and holding the rake at the desired elevation.

2. In a stone gathering and removing machine, the combination of a pair of ground wheels and axle in same, a main frame mounted on the axle and having means for engaging and drawing it on said wheels, a forwardly inclined endless main conveyer having a frame, pivoted at its rear end to swing up and down with the front end, a shovel carried by said front end, a short endless conveyer mounted in said frame above the shovel and arranged to move the stones rearwardly over the shovel, a pair of rearwardly converging rake bars carried by the main frame and having teeth by which to remove the stones from plowed land and gather them in front of the shovel, a clutch controlled operative connection between said elevators and the axle; means for raising, lowering and holding said shovel at the desired elevation, means for raising, lowering and holding the rake at the desired elevation, and a transversely inclined conveyer in rear of the main conveyer and operatively connected with the axle, for disposing of the stones beyond the side of the machine.

3. In a stone gathering and removing machine, the combination of a pair of ground wheels and axle in same, a main frame mounted on the axle and having means for engaging and drawing it on said wheels, a forwardly inclined endless main conveyer having a frame, pivoted at its rear end to swing up and down with the front end, a shovel carried by said front end, a short endless conveyer mounted in said frame above the shovel and arranged to move the stones rearwardly over the shovel, a pair of rearwardly converging rake bars carried by the main frame and having teeth by which to remove the stones from plowed land and gather them in front of the shovel, a clutch controlled operative connection between said elevators and the axle; means for raising, lowering and holding said shovel at the desired elevations, means for raising, lowering and holding the rake at the desired elevations, said means for drawing the machine comprising draft appliances, a rearwardly inclined draw bar connecting the draft appliance with the pivoted frame holding the shovel, said draw-bar having a slot, a pivot inserted through the slot and fixed in the main frame, and the means for raising and lowering the shovel being attached to said draw bar rearward of said pivot.

In testimony whereof I affix my signature.

JOSEPH J. VOGEL.

Copies of this patent may be obtained for five cents each, by addressing the "Commissioner of Patents, Washington, D. C."